Figure 1:
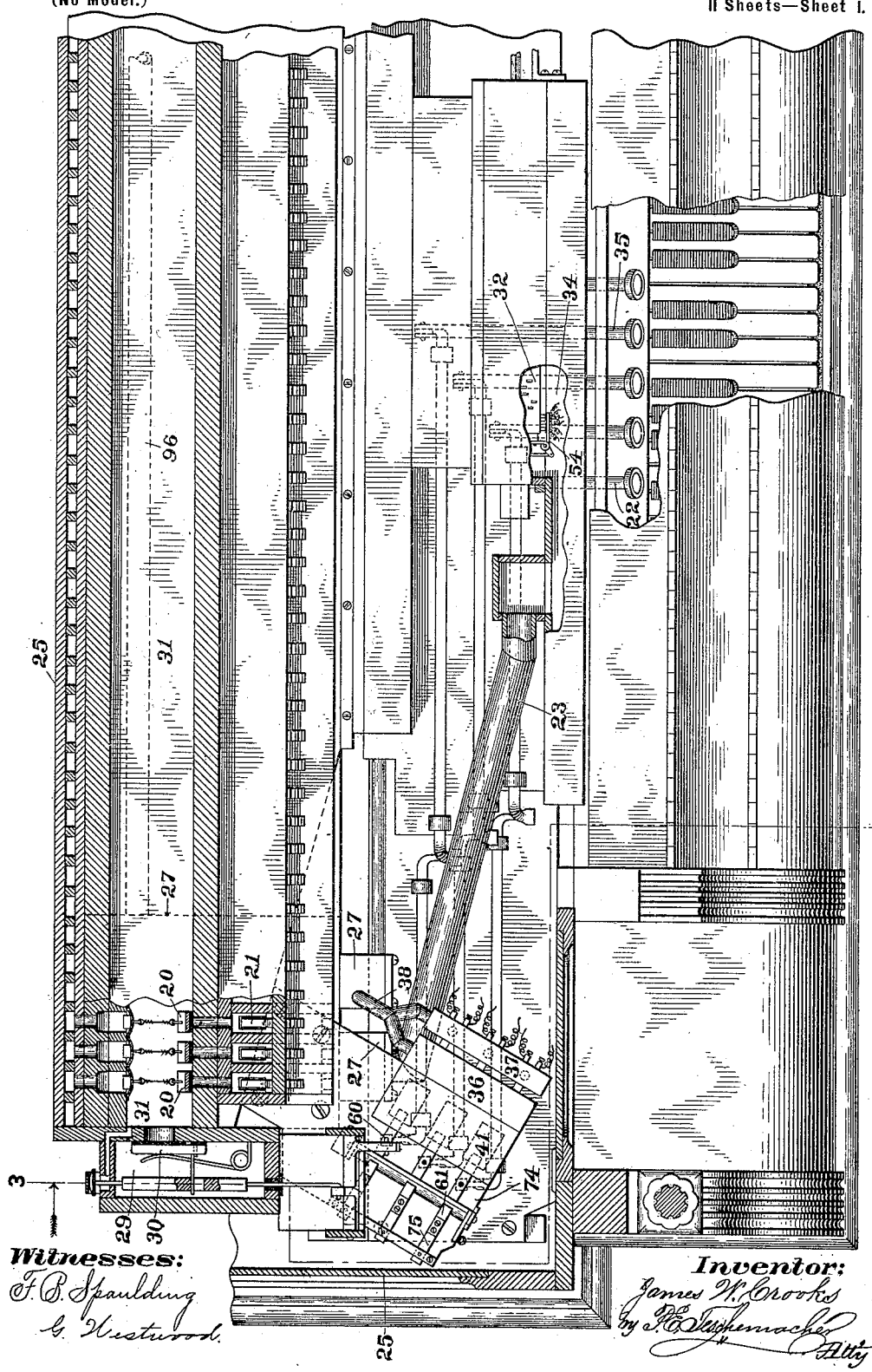

No. 697,327. Patented Apr. 8, 1902.
J. W. CROOKS.
AUTOMATICALLY OPERATED REED AND PIPE ORGAN.
(Application filed Sept. 3, 1901.)
(No Model.) 11 Sheets—Sheet 1.

Witnesses:
F. B. Spaulding
G. Westwood

Inventor:
James W. Crooks
by H. Tashenmacher
Atty

No. 697,327. Patented Apr. 8, 1902.
J. W. CROOKS.
AUTOMATICALLY OPERATED REED AND PIPE ORGAN.
(Application filed Sept. 3, 1901.)
(No Model.) II Sheets—Sheet 2.

Witnesses:
F. B. Spaulding
G. Westwood

Inventor:
James W. Crooks
by H. Teschemacher
Atty

No. 697,327. Patented Apr. 8, 1902.
J. W. CROOKS.
AUTOMATICALLY OPERATED REED AND PIPE ORGAN.
(Application filed Sept. 3, 1901.)
(No Model.) 11 Sheets—Sheet 4.

Witnesses:
F. B. Spaulding
G. Westwood

Inventor:
James W. Crooks
by F. Teschemacher
Atty

No. 697,327. Patented Apr. 8, 1902.
J. W. CROOKS.
AUTOMATICALLY OPERATED REED AND PIPE ORGAN.
(Application filed Sept. 3, 1901.)
(No Model.) 11 Sheets—Sheet 5.
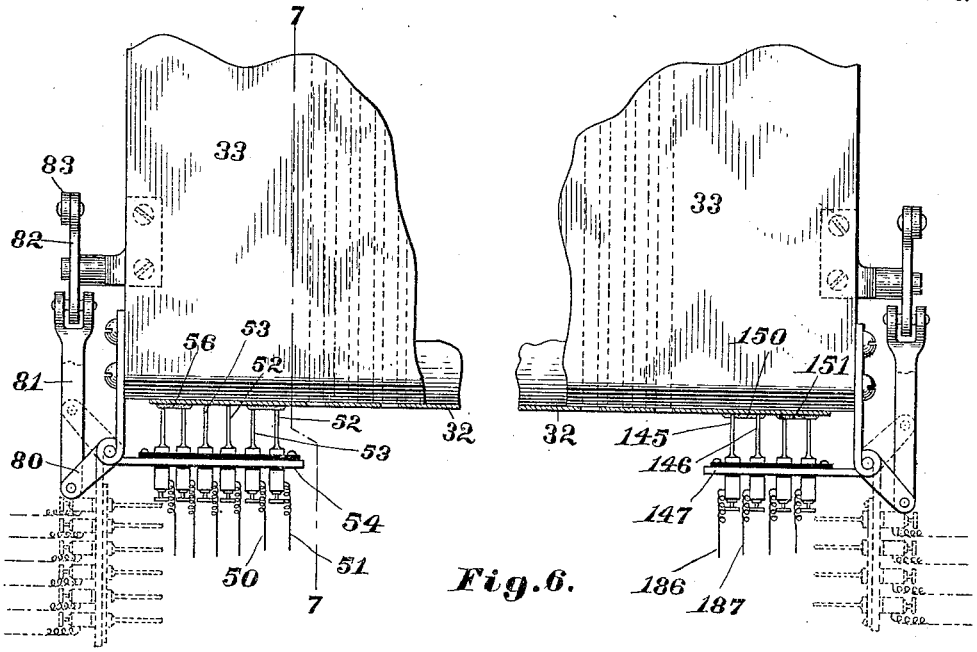
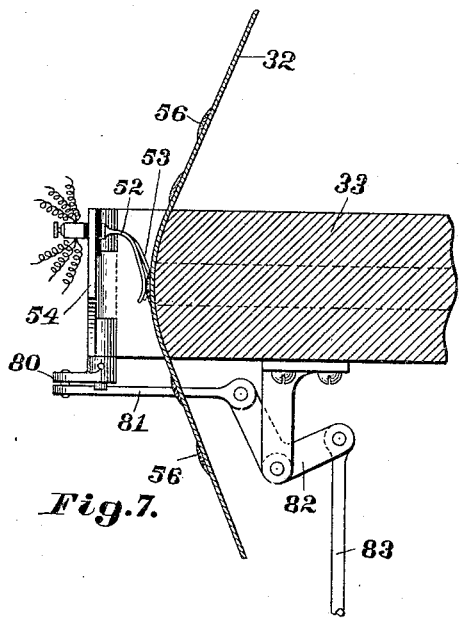
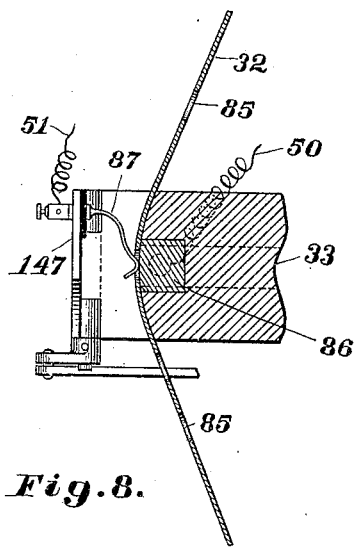
Witnesses:
F. B. Spaulding
G. Westwood
Inventor:
James W. Crooks No. 697,327. Patented Apr. 8, 1902.
J. W. CROOKS.
AUTOMATICALLY OPERATED REED AND PIPE ORGAN.
(Application filed Sept. 3, 1901.)
(No Model.) 11 Sheets—Sheet 6.

Witnesses:
F. B. Spaulding
G. Westwood

Inventor:
James W. Crooks

No. 697,327. Patented Apr. 8, 1902.
J. W. CROOKS.
AUTOMATICALLY OPERATED REED AND PIPE ORGAN.
(Application filed Sept. 3, 1901.)
(No Model.) 11 Sheets—Sheet 7.

Witnesses:
Inventor:

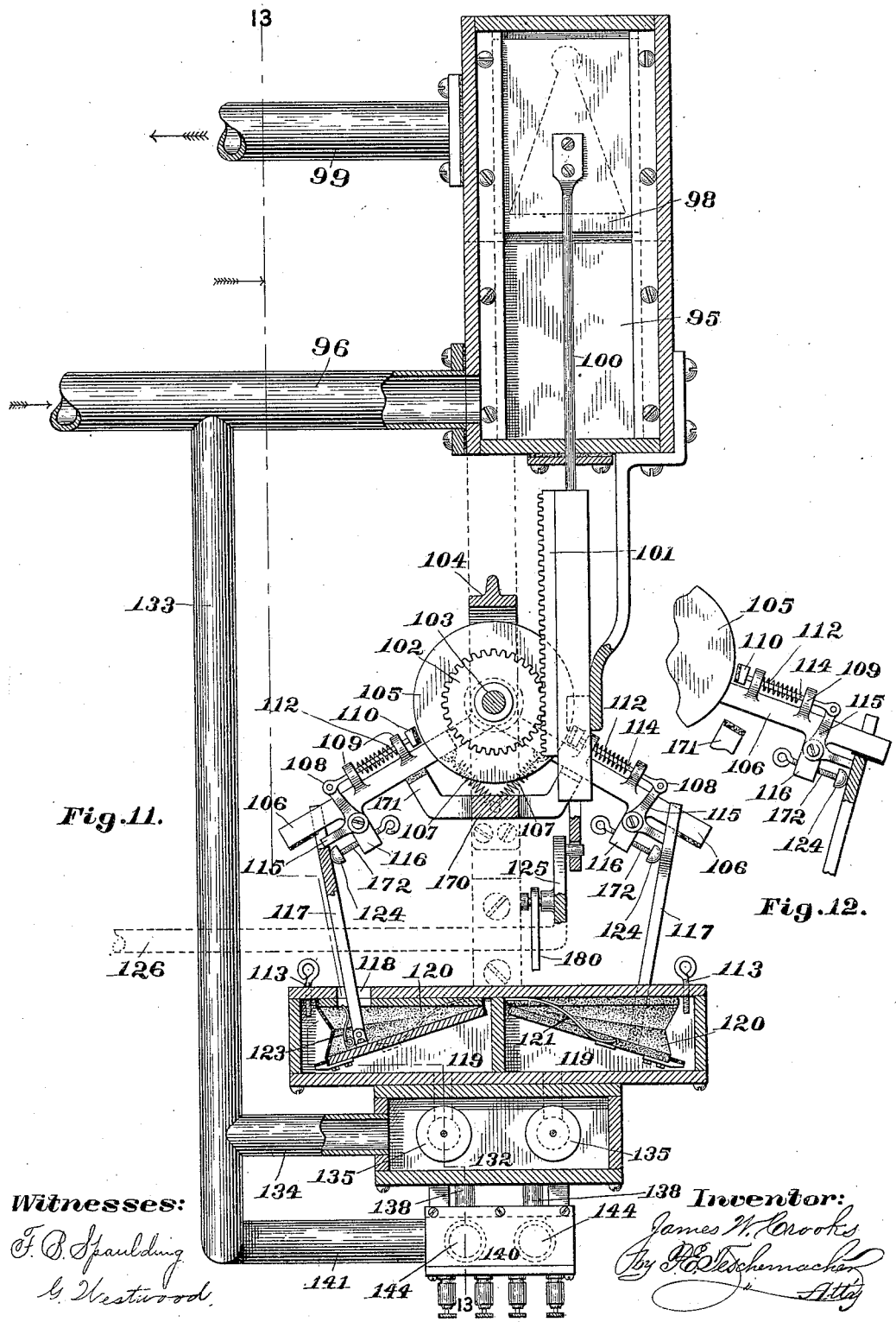

No. 697,327. Patented Apr. 8, 1902.
J. W. CROOKS.
AUTOMATICALLY OPERATED REED AND PIPE ORGAN.
(Application filed Sept. 3, 1901.)
(No Model.) 11 Sheets—Sheet 9.

No. 697,327. Patented Apr. 8, 1902.
J. W. CROOKS.
AUTOMATICALLY OPERATED REED AND PIPE ORGAN.
(Application filed Sept. 3, 1901.)

(No Model.) 11 Sheets—Sheet 11.

Witnesses:
F. B. Spaulding
G. Westwood.

Inventor:
James W. Crooks

UNITED STATES PATENT OFFICE.

JAMES W. CROOKS, OF BOSTON, MASSACHUSETTS, ASSIGNOR OF ONE-HALF TO WINCHESTER VEAZIE, OF BROOKLINE, MASSACHUSETTS.

AUTOMATICALLY-OPERATED REED AND PIPE ORGAN.

SPECIFICATION forming part of Letters Patent No. 697,327, dated April 8, 1902.

Application filed September 3, 1901. Serial No. 74,217. (No model.)

*To all whom it may concern:*

Be it known that I, JAMES W. CROOKS, a citizen of the United States, residing at Boston, in the county of Suffolk and State of Massachusetts, have invented certain Improvements in Automatically-Operated Reed and Pipe Organs, of which the following is a specification.

My invention relates to reed and pipe organs which are adapted to be automatically operated by means of a perforated music-sheet.

My invention has for its object, first, to automatically operate the various stops of an organ by mechanism controlled by the music-sheet, and, secondly, to provide mechanism controlled by the music-sheet whereby the speed of the motor-engine which operates said music-sheet may be automatically regulated to vary the time of the music as may be desired.

To these ends my invention consists in the novel features and combinations of parts hereinafter fully described, and pointed out in the claims.

Figure 2:
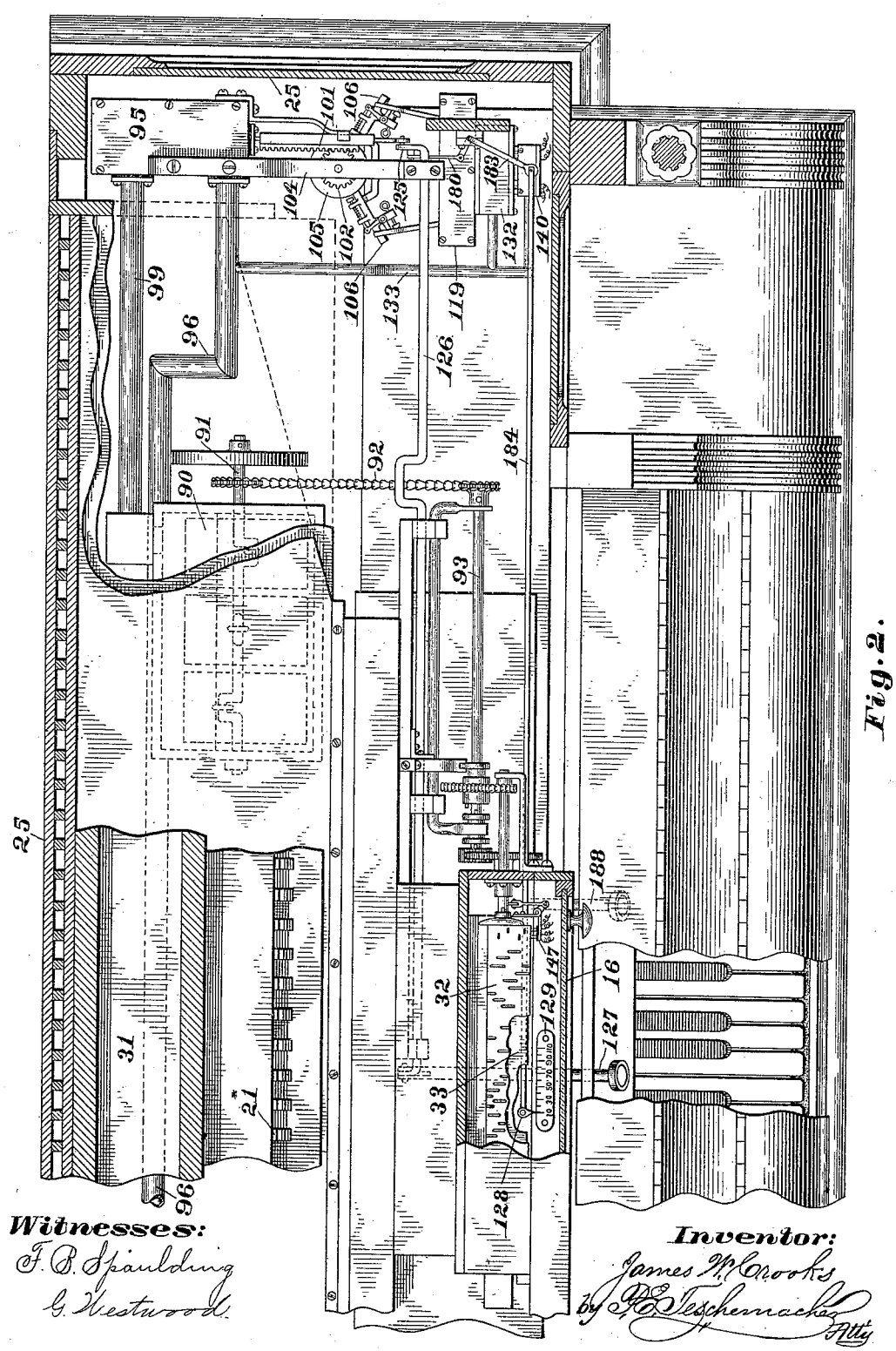
Figure 3:
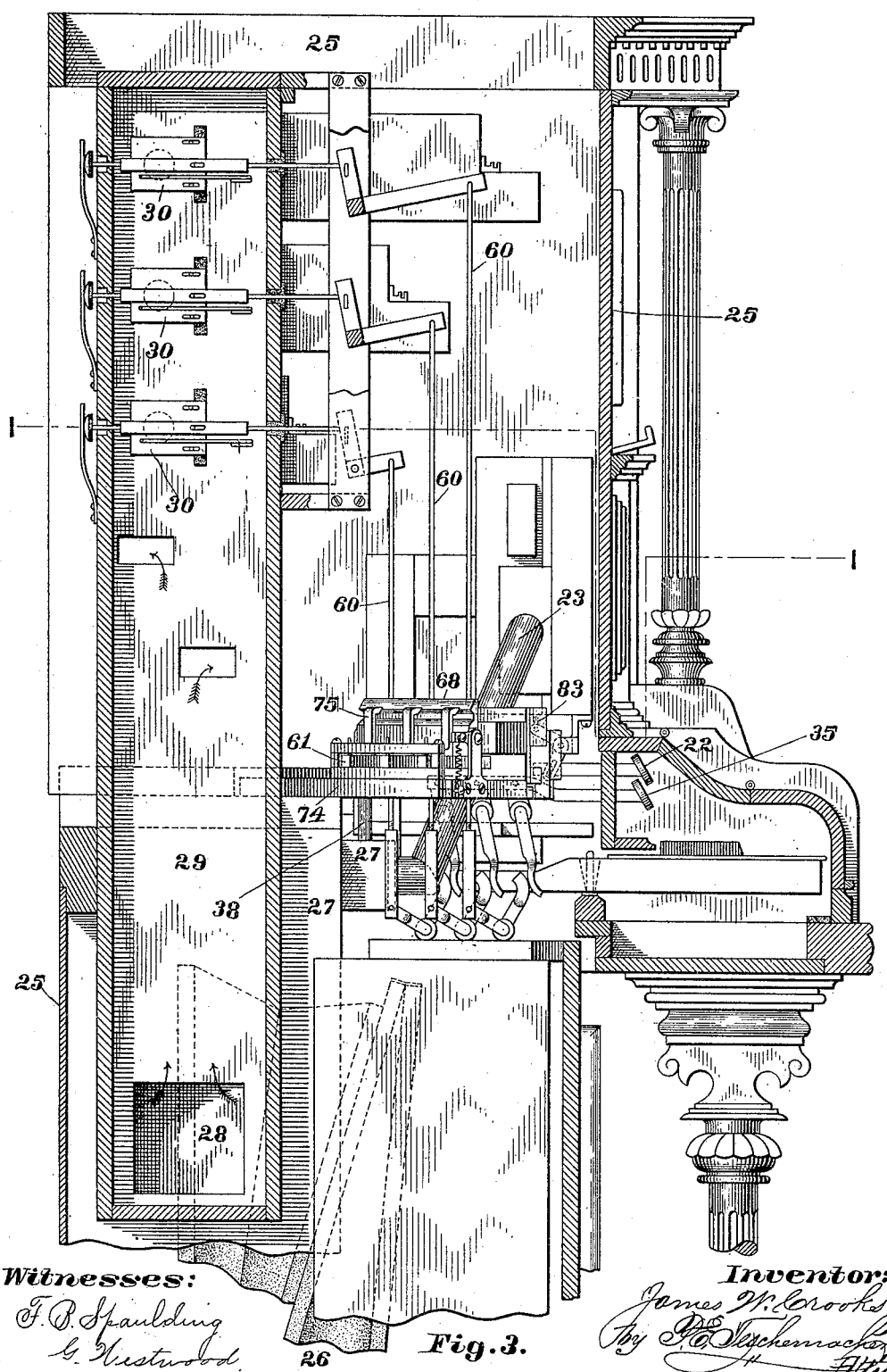
Figure 4:
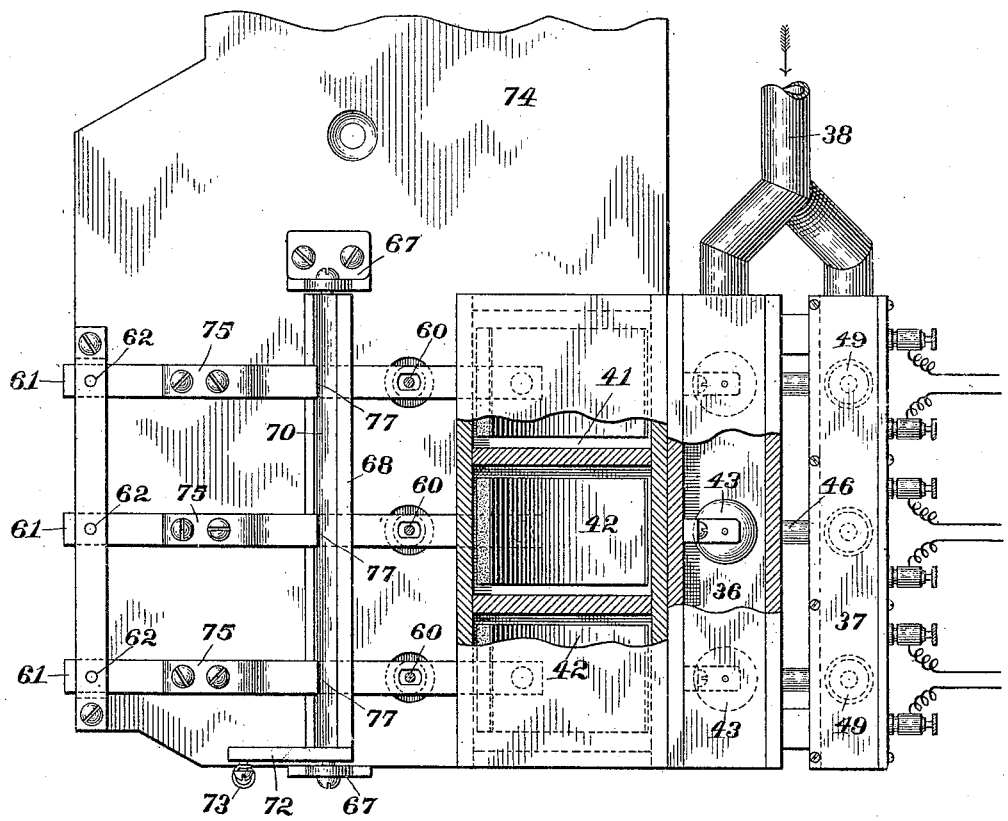
Figure 5:
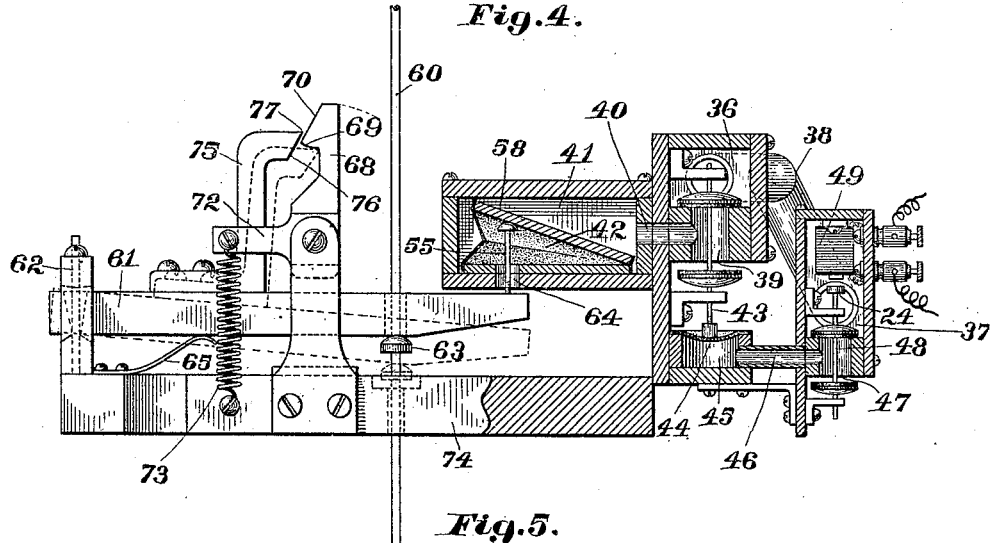
Figure 9:
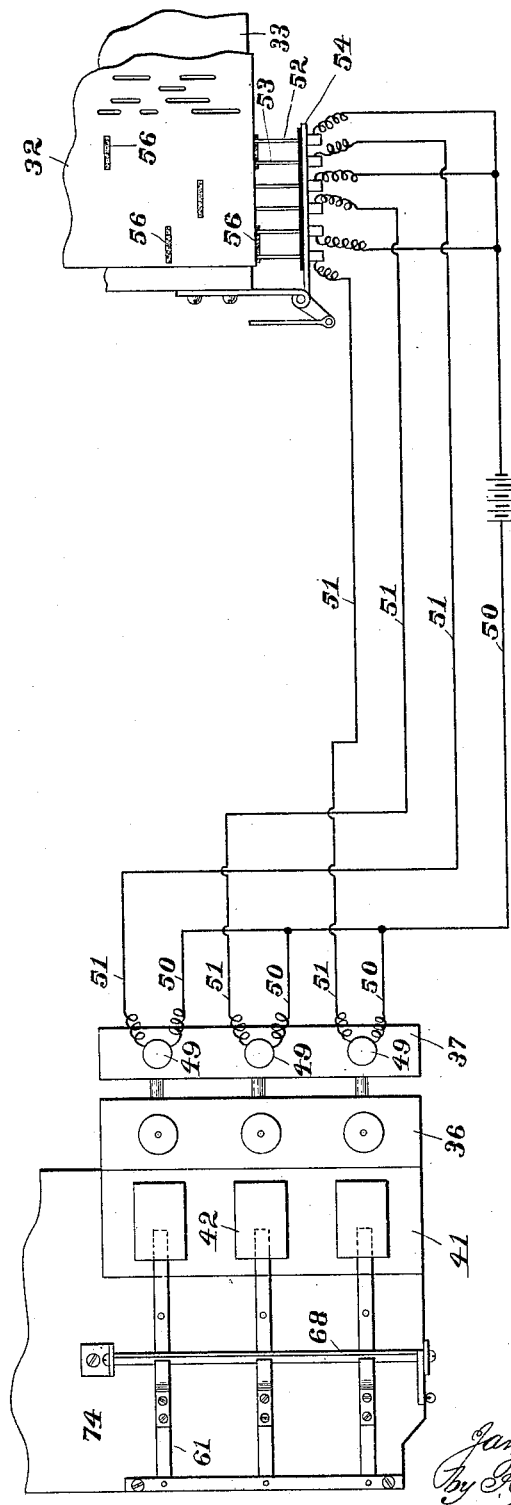
Figure 10:
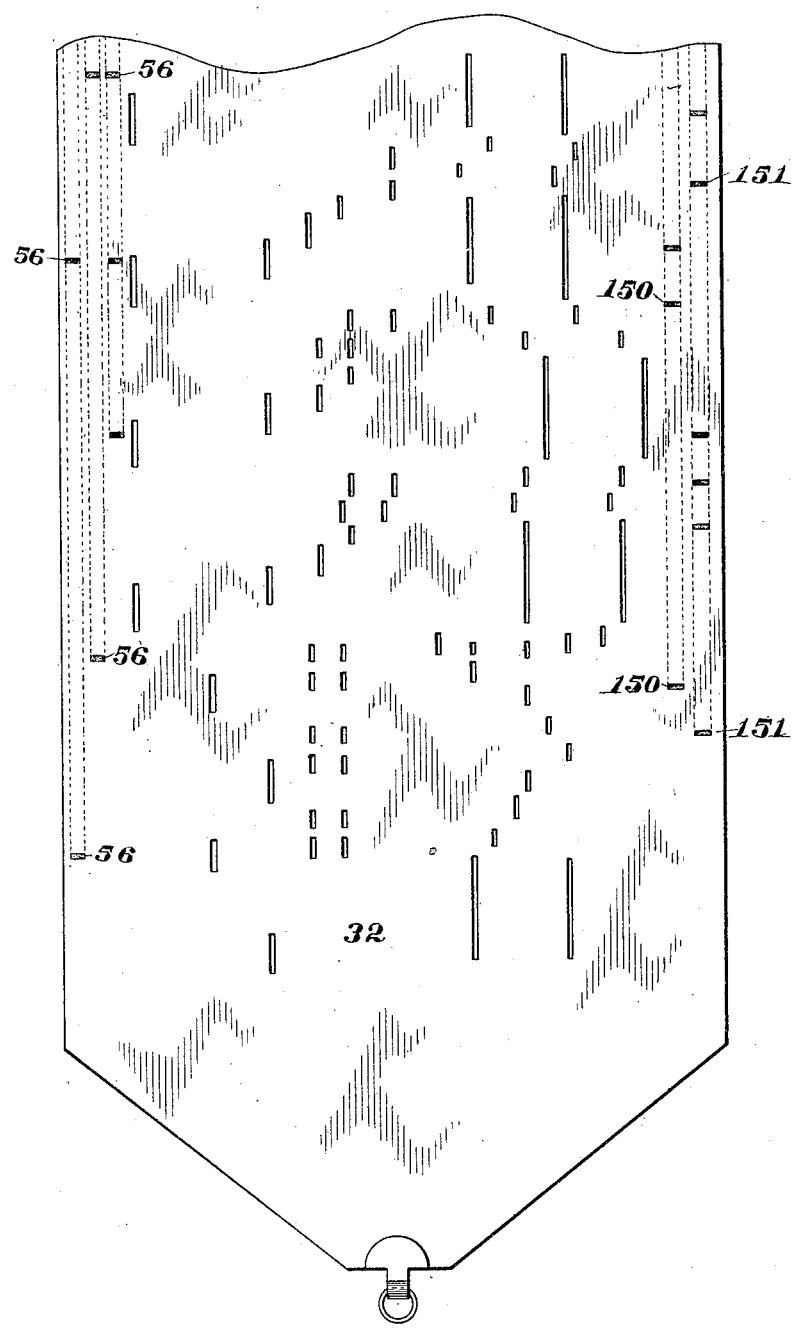
Figure 13:
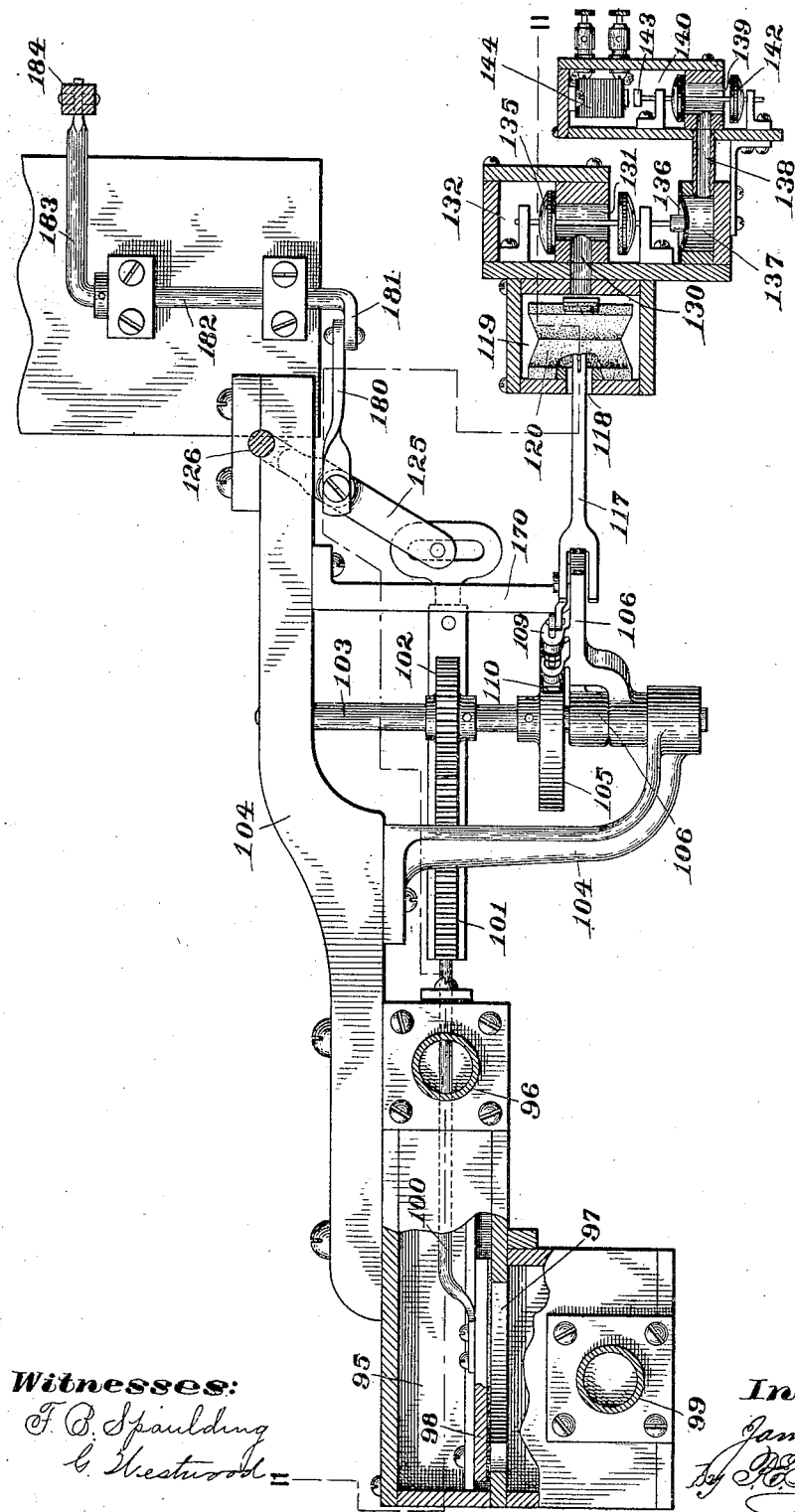
Figure 14:
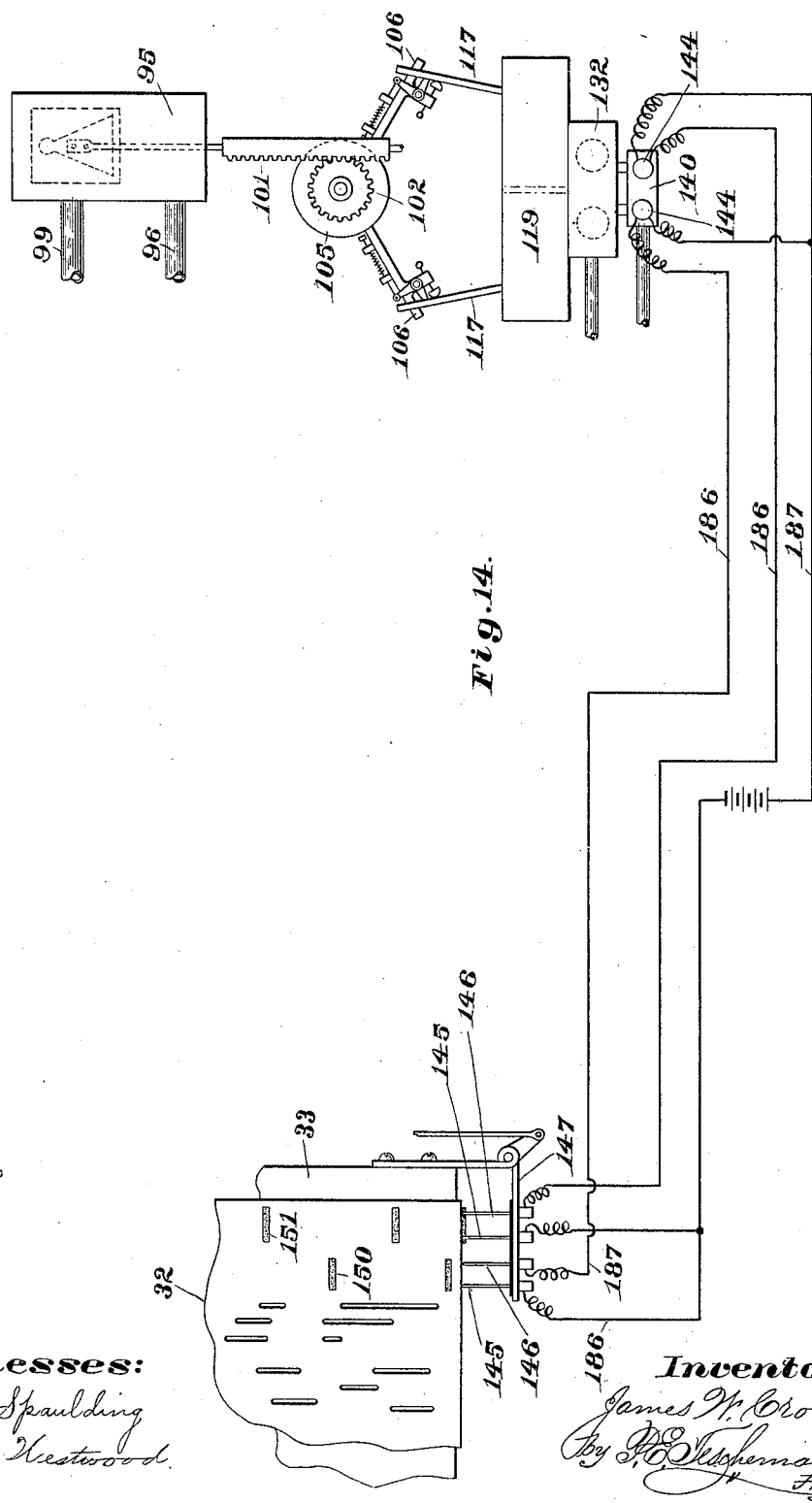
Figure 15:
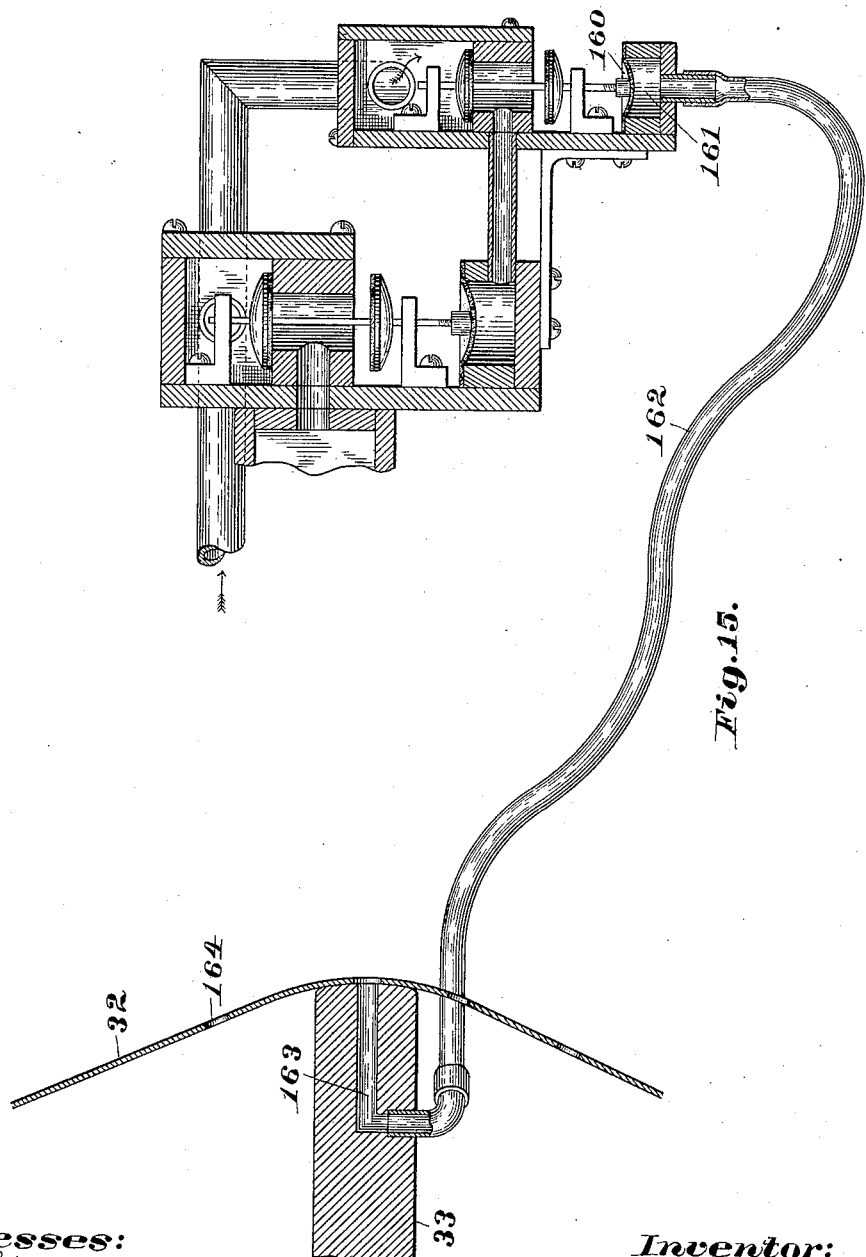

In the accompanying drawings, Figures 1 and 2 are horizontal sections of a reed-organ constructed in accordance with my invention, taken on the line 1 1 of Fig. 3. Fig. 3 is a vertical section on the line 3 3 of Fig. 1. Fig. 4 is an enlarged plan of a portion of the automatic stop-operating mechanism, parts being broken away to show the mechanism beneath. Fig. 5 is a sectional elevation of the same. Fig. 6 is a plan of the tracker-board, the central portion being broken away. Fig. 7 is a vertical section on the line 7 7 of Fig. 6. Fig. 8 is a modification to be referred to. Fig. 9 is a diagrammatic view of the automatic stop-operating mechanism. Fig. 10 is a plan of the music-sheet. Fig. 11 is a horizontal sectional plan on the line 11 11 of Fig. 13 of the mechanism for regulating the speed of the motor-engine to vary the time of the music. Fig. 12 is a detail of the friction device for operating the slide-valve of the motor speed-regulator, the parts being in their forward positions. Fig. 13 is a vertical sectional elevation on the line 13 13 of Fig. 11 looking in the direction of the arrow. Fig. 14 is a diagrammatic view of the motor-speed-regulating device. Fig 15 is a modification representing in vertical section a pneumatic device for operating the primary puppet-valve of the pneumatic stop-operating mechanism or that of the pneumatic mechanism for operating the valve of the motor-engine.

In the said drawings, 25 represents the outer casing of the instrument, in the lower portion of which is placed the bellows 26, Fig. 3, by means of which air is maintained under pressure in the wind-box 27 and from which it passes through the opening 28 into the wind-trunk 29, in which are arranged a series of stop-valves 30, which when opened allow the air under pressure to enter the long chambers or chests 31, Fig. 1, each containing the valves 20 of a set of reeds 21, said valves being operated to sound the notes by pneumatic mechanism controlled by a perforated music-sheet 32, Figs. 1, 2, and 10, which is wound from one roll onto another in the usual manner and passes over the tracker-board 33, provided with the usual ducts or passages communicating with the primary pneumatics which control the valve-operating mechanism, by means of which the reed-valves are operated in accordance with the perforations of the music-sheet in a well-known manner. The tracker-board 33 together with the music-sheet 32 and its carrying-rolls are inclosed within an air-tight box or chamber 34, provided in front with a sliding glass door 16, Fig. 2, which affords access to its interior when the music-sheet is to be changed, said box 34 being connected by a pipe 23, Fig. 3, with the wind-box 27, whereby it is supplied with air under pressure, which enters the ducts of the tracker-board when exposed by the passage thereover of the ordinary perforations of the music-sheet. This pneumatic mechanism, however, forms no part of my present invention and will not therefore be hereinafter further described.

The stop-valves 30 of the several sets of reeds 21 are capable of being operated, as usual, by means of lever-and-rod connections, with draw-stops or pulls 35, as shown in Fig. 3, whereby the compressed air may be admitted to the valve-chambers 31 of the several sets of reeds 21, so that one set alone or several sets may be used together in a well-known manner. I will now describe the means by which these stop-valves 30 are operated and controlled automatically by the music-sheet.

36 37, Figs. 1, 4, and 5, represent two chests forming a portion of the pneumatic stop-operating mechanism controlled by the music-sheet. These chests are supplied with air under pressure from the wind-box 27 by means of a pipe 38, having two branches which are connected with said chests 36 and 37, as shown in Figs. 1 and 4. In the bottom of the chest 36 are formed three ports or passages 39, leading to the open air, one for each stop-valve 30, and each of these passages 39 communicates through a passage 40 with one of three air-tight chambers 41, in which is placed a bellows-pneumatic 42 for a purpose to be presently described. As the mechanisms for operating the several stop-valves are exactly alike, but one will be described. The port 39 is open to the outer air and is normally closed to the compressed-air chest 36 by the upper disk of a puppet-valve 43, the stem of which rests on a diaphragm-pneumatic 44, beneath which is a chamber 45, communicating through a pipe 46 with a port 47, open to the outer air and also leading into the compressed-air chest 37, said port being normally closed to the air-chest 37 by the upper disk of a primary puppet-valve 48. Within the chest 37 are placed a series of electromagnets 49, one for each puppet-valve 48, the stem of which carries at its upper end a metallic disk 24, forming the armature of the magnet. Each magnet is arranged in an independent electric circuit, the conducting-wires 50 51 of which are respectively connected with two contact-springs 52 53, insulated in and projecting from the inner surface of a hinged plate 54, Figs. 6 and 7, located at one end of the tracker-board 33, said plate being adapted to be turned over on its hinge, by means to be hereinafter described, toward the edge of the music-sheet 32, so that the said contact-springs will bear on its surface as it passes over the tracker-board, the music-sheet being provided on its surface near the edge with metallic spots or portions 56, Figs. 6, 7, 9, and 10, spaced apart and arranged longitudinally in line with each other and with the contact-springs when the plate 54 is turned over toward the music-sheet, each metallic spot being of such width as to touch both contact-springs at the same time during the passage of the music-sheet, as shown in Fig. 6, thus closing the electric circuit, when the magnet 49 will attract its armature and lift the primary puppet-valve 48, the upper disk of which opens the port 47 to the chest 37, while its lower disk closes said port to the open air. The compressed air in the chest 37 will then pass by the pipe 46 to the chamber 45 beneath the pneumatic 44, which is then raised, lifting the puppet-valve 43, which thus closes the port 39 to the open air and opens it to the chest 36, allowing the compressed air to pass through the passage 40 into the chamber 41, when the bellows 42 will be instantly closed up by the pressure of the air on its movable member 58. The music-sheet is provided with a longitudinal line or row of metallic spots or portions 56 for each electric circuit. Consequently the number of rows of spots or circuit-closers 56 will correspond to the number of stops which the instrument contains. As soon as the circuit is broken by a metallic spot or circuit-closer 56 being carried away from the contact-springs 52 53 by the movements of the music-sheet the magnet 49 will cease to attract its armature 24, when the puppet-valve 48 will drop, causing its upper disk to close the port 47 to the air-chest 37 and its lower disk to open said port to the outer air, when the chamber 45 will be vented, causing the puppet-valve 43 to drop, thus closing the port 39 to the air-chest 36 and opening it to the outer air, when the chamber 41 will be vented through the passage 40 and port 39, leaving the bellows 42 free to be expanded by mechanism to be hereinafter described.

Each of the vertical rods 60, Figs. 3 and 5, which operate the stop-valves 30, passes loosely through a hole in a lever 61, fulcrumed at 62 in a suitable support, said rod 60 being provided directly beneath said lever 61 with an adjustable button or nut 63, so that any downward movement of the lever 61 will cause the rod 60 to be drawn down to open the stop-valve 30, connected therewith, while the rod 60 is free to be drawn down by means of the ordinary pull-knob 35, connected therewith, to open the stop-valve without moving or disturbing the lever 61. The free end of the lever 61 is provided with a headed pin 55, which passes up through a hole 64 into the pneumatic 42, against the under side of the movable member 58 of which it is held by a spring 65, bearing against the under side of said lever 61, whereby when the pneumatic 42 is collapsed by the closing of its electric circuit, as previously described, the lever 61 will be depressed, causing it to draw down the rod 60 and open the stop-valve 30, connected therewith. Each lever 61 when depressed against the resistance of its spring 65 is retained in position to hold its stop-valve open in the following manner: Directly above the levers 61, between uprights 67, is pivoted a rocker-board 68, having a longitudinal notch extending from end to end and forming a shoulder 69, above which the edge of the board is inclined upward and backward, as shown at 70, Fig. 5. Projecting at right angles from one end of this board is an arm 72, to the outer end of which is secured a spring 73, fastened at its lower end to the base-board 74, said spring tending to rock the board 68 over toward the left. To the upper side of each lever 61 near its fulcrum is rigidly secured an upright arm 75, having its upper portion turned at a right angle and provided with an inclined end 76 and an edge 77, which when the lever 61 is depressed is adapted to catch under the shoulder 69 of the board 68 by reason of the latter being pressed against the arm 75 by the spring 73 acting on the arm 72. Consequently as each lever 61 is depressed by the means described to open its stop-valve the inclined end 76 of its arm 75 will act on the incline 70 of the board 68, thus forcing it back until the arm 75 snaps under the shoulder 69, when the lever 61 will be retained in its downward position to hold the stop-valve open as desired. This forcing back of the board 68 by one of the arms 75 as its lever 61 is depressed will cause any other arm or arms 75 which may have been previously caught under the shoulder 69 to be released, when the corresponding spring-pressed lever or levers 61 will be raised to release the corresponding stop rod or rods 60 to cause the stop valve or valves connected therewith to be closed. If, however, such stop or stops are to be left on, the music-sheet will be provided at the required locations with circuit-closers, which will cause the proper pneumatic or pneumatics 42 to remain closed, thus holding down the lever or levers 61 controlled thereby, which will prevent the release of the arm or arms 75 of such lever or levers while the rocker-board is being forced back in the operation of drawing on another stop. It will thus be understood that whenever one of the metallic spots or portions 56 on the music-sheet is caused to close its electric circuit the stop-valve belonging to said circuit will be automatically opened and will remain so until released by the means previously described, the stops being thus automatically controlled by the music-sheet, which causes the desired stop or combination of stops to be drawn on and taken off at the proper times.

The metallic portions 56 may be applied to the surface of the music-sheet in any suitable or approved manner—for instance, by printing or stamping them on the paper with metallic paste or liquid, composed principally of metallic powder, such as bronze-powder, or, if desired, pieces of sheet metal may be secured to the music-sheet in any suitable manner.

The hinged plate 54 is thrown back into the positions shown in dotted lines in Fig. 6 to permit of the removal of the music-sheet or thrown over toward the edge of the music-sheet, as shown in full lines, to cause the contact-springs 52 53 to bear upon its surface by means of a crank-arm 80, secured to the hinged end of the plate 54, said arm 80 being connected by a rod 81, Figs. 6 and 7, with a bell-crank lever 82, to which is pivoted a rod 83, suitably connected with a pull-knob or stop 22, Fig. 3, at the front of the instrument, so that by pulling out or pushing in said knob the plate 54 can be thrown back out of the way of the music-sheet or over into operative position parallel with the surface of the music-sheet, as may be desired.

Instead of providing the music-sheet with metallic spots or portions adapted to act as circuit-closers said sheet may be provided with supplemental perforations 85, in which case one of the terminal wires 50 of the electric circuit will be connected with a metallic plate or block 86, inserted in the tracker-board 33, as shown in Fig. 8, which represents a modification of the means for closing the circuit. The other wire 51 is connected with a light insulated spring 87, the end of which is arranged to bear with a light pressure on the outer surface of the music-sheet in the path of its supplemental perforations 85, so as to pass through each one into contact with the plate 86 of the tracker-board, as shown in Fig. 8, thus closing the circuit each time that a perforation 85 in the music-sheet permits the spring 87 to contact with the plate 86.

I will now describe the "tempo-regulator" or means by which the speed of the motor-engine which operates the music-sheet is automatically regulated by the music-sheet itself to vary the time of the music.

90, Fig. 2, denotes an ordinary air motor-engine, the shaft 91 of which is connected with a shaft 93 by means of a chain 92, running over sprocket-wheels on said shafts, the motion of the shaft 93 being transmitted by means of suitable connections to the ordinary mechanism for winding and rewinding the music-sheet.

95 represents the valve-chest of the air motor-engine, which is supplied with air under pressure from the wind-box 27 by means of a pipe 96, Figs. 2 and 11, the air passing, as usual, through a port 97, commanded by a slide-valve 98, into a pipe 99, and thence to the air motor-engine 90 to actuate the same. The valve-rod 100 of the valve 98 is provided outside the valve-chest 95 with a rack-bar 101, with which meshes a gear 102, mounted on a short vertical shaft 103, supported in suitable bearings in a frame 104 and carrying a friction-wheel 105.

106 106 are two levers loosely pivoted on the shaft 103 and normally retained in the position shown in Fig. 11 by means of springs 107, fastened to said levers and to an arm 170, projecting from the frame 104, said arm 170 being provided at its lower end with projections 171, which serve as stops to limit the backward movement of the levers 106. Each of these levers 106 is provided with a rod 108, sliding in lugs 109 and carrying at its outer end a friction-shoe 110, which is adapted to be forced into contact with the periphery of the wheel 105 against the resistance of a light spring 112, encircling the rod 108 between said lugs 109 and acting on a pin 114, passing through said rod 108. To the outer end of the rod 108 is pivoted one arm of a bell-crank 115, fulcrumed on a projection 116 on the lever 106. The other arm of said bell-crank normally passes between bifurcations formed at the forward end of a rod 117, the rear end of which passes through a hole 118 in an air-tight box or chamber 119 and is pivoted to the movable board or member of a bellows-pneumatic 120, inclosed in said chamber 119 and adapted to be closed up against the resistance of a spring 121 by the force of compressed air introduced into said box 119 in a manner to be hereinafter described, said boxes and their bellows-pneumatics forming a part of pneumatic mechanism controlled by the music-sheet, as will be hereinafter described. At the commencement of the closing up of the bellows 120 the forked end of the rod 117, acting on the bell-crank 115, causes the shoe 110 to be brought into contact with the friction-wheel 105, the spring 107, which is much stronger than the spring 112, holding the lever 106 stationary until the shoe 110 has been brought firmly against the periphery of the wheel 105, when the further forward movement of the rod 117, as the bellows 120 is closed up, will produce through said friction device and the connections described a partial rotation of the wheel 105 and gear 102, the latter through the medium of the rack-bar 101 and valve-rod 100 moving the valve 98, as required, the left-hand lever 106 and mechanism connected therewith serving to rotate the wheel 105 in the proper direction to open the valve 98, while the right-hand lever 106 and mechanism connected therewith act to rotate the wheel 105 in the opposite direction to close said valve. Each impulse of one of the levers 106 moves the valve 98 a short distance, so that a number of successive impulses are required to fully open or fully close the valve, thus enabling the speed of the motor-engine to be gradually regulated with the greatest nicety. The amount of the movement of the bellows and the corresponding movement of the valve-rod and valve may be adjusted by means of a regulating-screw 113, Fig. 11, which acts as a stop for the movable member of the bellows 120. Within the bellows 120 is a light spring 123, which bears on the rod 117 near its pivot, and tends to force it toward the bell-crank 115, as shown at the left-hand side of Fig. 11, and thus keep it in contact with a throw-off button 124, secured to the end of a regulating-screw 172, passing through the projection 116. As the rod 117 is pushed forward by the closing up of the bellows 120 it is forced outward by the button 124 until the bell-crank 115 becomes disengaged from its forked end, as shown in Fig. 12, which occurs an instant before the termination of the forward movement of the lever 106, when the spring 112 will withdraw the shoe 110 from the friction-wheel 105, leaving the latter free to be again moved in the same direction or in the opposite direction by the lever 106 on its opposite side. On the return or backward movement of the rod 117 the free arm of the bell-crank 115, against which said rod is pressed by the spring 123, will fall into its place in the forked end of said rod 117, which will then be ready to act on the bell-crank to bring the shoe 110 against the friction-wheel on its next forward movement.

The valve-rod 100 is connected with a crank-arm 125 at the end of a rod 126, as shown in Figs. 2 and 13, said rod being bent at its opposite end, forming a crank-arm to which is connected a pull-knob 127, Fig. 2, whereby the motor-valve can be operated in the ordinary manner by hand when desired. To the crank-arm 125 is loosely pivoted a link 180, Figs. 2 and 13, connected with a crank 181 at the lower end of a vertical rod 182, at the upper end of which is another crank-arm 183, to which is pivoted a long rod 184, provided with the usual pointer 128, traversing an indicating-scale 129, Fig. 2.

Each chamber 119, containing one of the bellows-pneumatics 120, communicates through a passage 130, Fig. 13, with a port 131, normally open to the outer air at one end and also leading into a chest 132, which is supplied with compressed air from the wind-box 27 through the pipe 96 and intermediate pipes 133 134, as shown in Fig. 11. This port is normally closed to the chest 132 by the upper disk of a puppet-valve 135, the lower end of the stem of which rests on a diaphragm-pneumatic 136, forming the top of a chamber 137, communicating by means of a passage 138 and a port 139 with another compressed-air chest 140, supplied from the wind-box 27 through a short pipe 141, Fig. 11, connected with the pipe 133. The port 139 is normally open to the outer air and normally closed to the compressed-air chamber 140 by the upper disk of a primary puppet-valve 142, the stem of which carries at its upper end a metallic disk 143, forming the armature of an electromagnet 144. Each magnet 144 is arranged in an independent electric circuit, the conducting-wires 186 187 of which are respectively connected with two contact-springs 145 146, insulated in and projecting from a hinged plate 147, located at the end of the tracker-board opposite to that to which the hinged plate 54, connected with the stop-operating mechanism, is applied, and connected in a similar manner with a pull knob or stop 188 at the front of the instrument, (shown in dotted lines in Fig. 2,) whereby said plate 147 may be thrown back to permit of the removal of the music-sheet or thrown over toward the edge of the music-sheet to cause the contact-springs 145 146 to bear upon the surface of the music-sheet, as shown at the right-hand end of Fig. 6 and in Fig. 14, said music-sheet being here provided along its right-hand edge with two rows of metallic spots or portions 150 151, arranged in longitudinal lines and acting as circuit-closers for the two electric circuits in exactly the same manner as the metallic spots 56 at the opposite edge of the music-sheet.

The operation of the pneumatic mechanism connected with the two bellows 120 120 and the manner in which it is controlled by the metallic spots 150 151 of the music-sheet being precisely similar to that of the pneumatic and electric mechanism by which the stop-valves 30 are operated will not therefore be described, it being understood that the bellows-pneumatic 120, which opens the motor slide-valve 98, is controlled by one electric circuit and row of metallic spots on the music-sheet, and the bellows-pneumatic which closes said valve is controlled by the other electric circuit and row of metallic spots on said music-sheet, so that by a proper arrangement of these two rows of spots 150 151 the motor-valve can be controlled with the greatest nicety to vary the speed of the motor-engine in order to produce the precise musical effects desired at the proper moments, the amount of air admitted to the motor-engine and its consequent speed being at all times indicated on the scale 129 by the pointer 128.

Instead of operating the primary puppet-valve of the stop-valve pneumatic mechanism or the primary puppet-valve of the motor-engine valve pneumatic mechanism by means of electric mechanism controlled by the music-sheet, as above described, it may be operated by a pneumatic device, as shown in Fig. 15, which represents a modification of the means for operating the primary puppet-valve. In this case the stem of the primary puppet-valve rests on a diaphragm-pneumatic 160, beneath which is a chamber 161, which communicates through a pipe 162 with a supplemental duct 163 in the tracker-board, adapted to register with supplemental perforations 164, formed in the music-sheet, so that when one of said perforations 164 is brought over the said supplemental duct 163 the compressed air in the tight box or chamber 34, in which the said music-sheet is inclosed, will instantly enter the pipe 162 and raise the pneumatic 160, thus lifting the primary puppet-valve to produce the same result as is effected by the electromagnets previously described.

What I claim as my invention, and desire to secure by Letters Patent, is—

1. In an organ automatically operated by means of a perforated music-sheet, the combination with the stop-valves and the lever-and-rod mechanism for operating the same, of supplemental levers for operating the stop-valve rods to open the stop-valves, pneumatic mechanisms for operating said supplemental levers, means for retaining each supplemental lever after being depressed to hold open the stop-valve connected therewith, and electrically-operated mechanisms controlled by the music-sheet for controlling the operation of said pneumatic mechanisms.

2. In an automatically-operated organ, the combination with the stop-valves and the lever-and-rod mechanism for operating the same, of a series of supplemental spring-pressed levers provided with holes through which loosely pass the stop-valve rods, the latter having buttons or nuts on which said levers act to draw down said rods, independent pneumatic mechanism for actuating each lever to open the stop-valve connected therewith, means controlled by the music-sheet for independently operating the pneumatic mechanism of each of said levers, and a retaining device consisting of a pivoted spring-pressed rocker-board having a longitudinal shoulder, and arms projecting from said levers and adapted to engage said shoulder, whereby, each lever after being depressed to open its stop-valve may be retained to hold said valve open, or when retained may be released to permit said valve to be closed.

3. In an automatically-operated organ, the combination with the stop-valves and the lever-and-rod mechanism for operating the same, of a series of supplemental levers provided with holes through which loosely pass the stop-valve rods, the latter having buttons or nuts on which said levers act to draw down said rods, independent pneumatic mechanism for actuating each lever to open the stop-valve connected therewith, an electric circuit for the pneumatic mechanism of each supplemental lever, said circuit containing a magnet for actuating the primary puppet-valve of said pneumatic mechanism, a music-sheet provided with longitudinal rows of metallic spots or portions acting as circuit-closers, whereby said pneumatic mechanism is brought into action, and a retaining device, whereby each supplemental lever, when depressed to open its stop-valve, may be retained in position to hold said stop-valve open, or when retained may be released to permit said stop-valve to be closed.

4. In an automatically-operated organ, the combination with the motor for actuating the music-sheet and its inlet-valve, of pneumatic mechanism for moving said valve in a direction to open the same, pneumatic mechanism for moving said valve in the opposite direction to close the same, and means controlled by the music-sheet for independently controlling the operation of each of said pneumatic mechanisms.

5. In an automatically-operated organ, the combination with the motor for actuating the music-sheet and its inlet-valve, of pneumatic mechanism for moving said valve in a direction to open the same, pneumatic mechanism for moving said valve in the opposite direction to close the same, and electrically-operated mechanism controlled by the music-sheet for independently controlling the operation of each of said pneumatic mechanisms.

6. In an automatically-operated organ, the combination with the motor for actuating the music-sheet, and its inlet-valve, of pneumatic mechanism for moving said valve in a direction to open the same, pneumatic mechanism for moving said valve in the opposite direction to close the same, an electric circuit for each of said pneumatic mechanisms, said circuit containing a magnet for actuating the primary puppet-valve of said pneumatic mechanism, and a music-sheet provided with longitudinal rows of metallic spots or portions acting as circuit-closers, whereby said pneumatic mechanisms are independently brought into action to effect the opening or closing of said motor-valve.

7. In an automatically-operated organ, the combination with the motor for actuating the music-sheet and its inlet-valve and valve-rod, of friction feed mechanism for intermittently moving said valve-rod in opposite directions, whereby said valve may be gradually opened or closed, mechanism connected with said valve-rod to indicate the amount of movement of said valve, pneumatic mechanism for actuating said valve-rod feed mechanism, and means automatically controlled by the music-sheet for controlling the operation of said pneumatic mechanism.

8. In an automatically-operated organ, the combination with the motor for actuating the music-sheet and its inlet-valve and valve-rod, of a rack-bar secured to the valve-rod, a gear in mesh with said rack-bar, a friction-wheel fast on the shaft of said gear, a pair of levers fulcrumed on the gear-shaft and arranged on opposite sides of the friction-wheel, sliding shoes mounted on said levers and adapted to be brought into contact with the friction-wheel to intermittently rotate the same in opposite directions, rods for moving said levers and friction-shoes, means for withdrawing the shoes from contact with the friction-wheel, pneumatic mechanisms for independently actuating said rods and friction-shoes to open or close the motor-valve, and means automatically controlled by the music-sheet for independently controlling the operation of each of said pneumatic mechanisms to vary the speed of the motor.

9. In an automatically-operated organ, the combination with the motor, its inlet-valve and valve-rod, the latter provided with a rack-bar, the gear meshing with said rack-bar, and the friction-wheel on the gear-shaft, of a lever fulcrumed on the gear-shaft, a friction-shoe secured to a sliding spring-pressed rod mounted on said lever, a bell-crank pivoted to said sliding rod, a forked rod embracing the end of the lever, pneumatic mechanism for actuating said forked rod, and a throw-off device mounted on said lever and adapted to disengage said bell-crank from said forked rod to relieve the friction-wheel of the pressure of the sliding shoe, substantially as described.

Witness my hand this 31st day of August, A. D. 1901.

JAMES W. CROOKS.

In presence of—
P. E. TESCHEMACHER,
F. B. SPAULDING.